United States Patent
Kuranuki (10) Patent No.: US 9,955,136 B2
(45) Date of Patent: Apr. 24, 2018

(54) DISTANCE MEASURING DEVICE AND VEHICLE PROVIDED THEREWITH

(71) Applicant: Yamaha Hatsudoki Kabushiki Kaisha, Iwata-shi, Shizuoka (JP)

(72) Inventor: Yoshiki Kuranuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 142 days.

(21) Appl. No.: 14/437,199

(22) PCT Filed: Oct. 15, 2013

(86) PCT No.: PCT/JP2013/077963
§ 371 (c)(1),
(2) Date: Apr. 21, 2015

(87) PCT Pub. No.: WO2014/065159
PCT Pub. Date: May 1, 2014

(65) Prior Publication Data
US 2015/0288943 A1    Oct. 8, 2015

(30) Foreign Application Priority Data

Oct. 22, 2012    (JP) .................................. 2012-232909

(51) Int. Cl.
*H04N 7/18*     (2006.01)
*H04N 13/00*    (2018.01)
(Continued)

(52) U.S. Cl.
CPC ......... *H04N 13/0018* (2013.01); *G01C 3/085* (2013.01); *G01S 5/16* (2013.01);
(Continued)

(58) Field of Classification Search
CPC .......... G06T 2207/10028; G06T 7/593; G05D 1/0251; G01C 3/085; G01S 5/16; H04N 2013/0081
(Continued)

(56) References Cited

U.S. PATENT DOCUMENTS 5,307,136 A * 4/1994 Saneyoshi .............. B60Q 9/008
                                                                180/167
5,410,346 A * 4/1995 Saneyoshi ................ B60R 1/00
                                                                348/116
(Continued)

FOREIGN PATENT DOCUMENTS

DE    10 2009 006 125 A1    9/2009
EP              626654 A2 * 11/1994
(Continued)

OTHER PUBLICATIONS

Aoki et al, Machine genrated translation of JP 05-307695 A, Nov. 1993.*
(Continued)

*Primary Examiner* — David Harvey
(74) *Attorney, Agent, or Firm* — Keating and Bennett, LLP (57) ABSTRACT

A distance measuring device reduces an amount of calculations required to generate a parallax image. The distance measuring device that generates the parallax image to measure a distance includes image sensors each capturing an image, an edge image extractor that extracts an edge image in accordance with the image, the edge image including pixel values each containing identification information used to identify an edge caused by a brightness variation from light to dark or an edge caused by a brightness variation from dark to light, a binarized edge image generator that generates a binarized edge image in accordance with the identification information of the edge image, a parallax
(Continued)

image generator that generates the parallax image from the binarized edge image, and a distance image calculator that calculates a distance image from the parallax image.

7 Claims, 8 Drawing Sheets

(51) Int. Cl.
- *G01S 5/16* (2006.01)
- *G01C 3/08* (2006.01)
- *H04N 13/02* (2006.01)
- *G05D 1/02* (2006.01)
- *G06T 7/564* (2017.01)
- *G06T 7/593* (2017.01)

(52) U.S. Cl.
CPC .......... *G05D 1/0251* (2013.01); *G06T 7/564* (2017.01); *G06T 7/593* (2017.01); *H04N 13/0242* (2013.01); *G05D 2201/0204* (2013.01); *G06T 2207/10012* (2013.01); *G06T 2207/10028* (2013.01); *G06T 2207/20112* (2013.01); *G06T 2207/30261* (2013.01); *H04N 7/181* (2013.01)

(58) Field of Classification Search
USPC ............................................... 348/47
See application file for complete search history.

(56) References Cited

U.S. PATENT DOCUMENTS

| | | | | |
|---|---|---|---|---|
| 5,729,216 A * | 3/1998 | Sasaki | ................... | B60Q 9/008 340/903 |
| 6,163,337 A * | 12/2000 | Azuma | ................... | G06T 15/10 348/43 |
| 6,590,521 B1 * | 7/2003 | Saka | ................... | G01S 13/931 180/167 |
| 6,690,451 B1 * | 2/2004 | Schubert | ................ | G01C 11/06 356/3.14 |
| 6,788,817 B1 * | 9/2004 | Saka | ................... | G06K 9/3241 382/190 |
| 8,959,598 B2 * | 2/2015 | Smith | ................... | H04L 63/06 380/270 |
| 2001/0002936 A1 | 6/2001 | Tsuji et al. | | |
| 2001/0014215 A1 * | 8/2001 | Ide | ................... | G02B 7/34 396/96 |
| 2003/0091228 A1 * | 5/2003 | Nagaoka | ........... | G06K 9/00651 382/154 |
| 2005/0072902 A1 * | 4/2005 | Visee | ................... | G01P 3/806 250/208.1 |
| 2007/0127779 A1 | 6/2007 | Miyahara | | |
| 2007/0230743 A1 * | 10/2007 | Mannerheim | ...... | G06K 9/00234 382/103 |
| 2008/0056562 A1 * | 3/2008 | Hosoi | ................ | G06K 9/00369 382/155 |
| 2009/0080876 A1 * | 3/2009 | Brusnitsyn | ............. | G03B 13/36 396/128 |
| 2009/0190827 A1 * | 7/2009 | Saito | ....................... | G06T 7/593 382/154 |
| 2011/0135156 A1 * | 6/2011 | Chen | ....................... | G06K 9/325 382/105 |
| 2012/0082369 A1 * | 4/2012 | Ogishima | .......... | H04N 13/0022 382/154 |
| 2012/0263353 A1 * | 10/2012 | Kitajima | ............... | G01S 7/4802 382/106 |
| 2014/0168385 A1 * | 6/2014 | Sudo | ....................... | G03B 17/18 348/47 |
| 2014/0205182 A1 * | 7/2014 | Ono | ................... | H04N 13/0022 382/154 |
| 2015/0288943 A1 * | 10/2015 | Kuranuki | .................. | G01S 5/16 348/47 |

FOREIGN PATENT DOCUMENTS

| | | | |
|---|---|---|---|
| EP | 0626654 A2 * | 11/1995 | |
| JP | 403039604 A * | 2/1991 | |
| JP | 04-078924 B2 | 12/1992 | |
| JP | 05307695 A * | 11/1993 | |
| JP | 08-075454 A * | 3/1996 | |
| JP | 08-278126 A * | 10/1996 | |
| JP | 09-072716 A | 3/1997 | |
| JP | 11-351862 A | 12/1999 | |
| JP | 2000207693 A * | 7/2000 | |
| JP | 2001-082954 A * | 3/2001 | |
| JP | 2001082954 * | 3/2001 | |
| JP | 2001-116545 A * | 4/2001 | |
| JP | 2001-160144 A | 6/2001 | |
| JP | 2003-005832 A | 1/2003 | |
| JP | 2007-131178 A | 5/2007 | |
| JP | 2009014444 A * | 1/2009 | |
| JP | 2009-025050 A * | 2/2009 | |
| JP | 2009-025910 A | 2/2009 | |
| JP | 2010-165142 A | 7/2010 | |

OTHER PUBLICATIONS

Shima, Machine generated translation of JP 2001-082954 A, Mar. 2001.*

Official Communication issued in International Patent Application No. PCT/JP2013/077963, dated Jan. 14, 2014.

Official Communication issued in corresponding European Patent Application No. 13848539.6, dated Dec. 3, 2015.

Ens. et al., "Real-time Motion Stereo", IEEE, XP010095864, 1993, pp. 130-135.

* cited by examiner

DISTANCE MEASURING DEVICE AND VEHICLE PROVIDED THEREWITH

BACKGROUND OF THE INVENTION

1. Field of the Invention

The present invention relates to a distance measuring device that measures a distance using a parallax image as well as a vehicle provided with the device.

2. Description of the Related Art

Various studies have been conventionally conducted regarding a distance measuring method using a parallax image. The parallax image is generated by a stereo method. The most general method among conventional distance measuring methods is described below. That is, a plurality of images is shifted by a parallax. Then, the sum of absolute differences (SAD) in the difference of brightness between a target pixel and pixels adjacent thereto is calculated. Then a parallax image is generated regarding a parallax with the smaller SAD as a parallax of the target pixel.

When the parallax image is generated using an FPGA (Field Programmable Gate Array) or a small CPU, the direct use of brightness values or values indicating extracted edge features leads to an increased calculation scale and thus increases the memory that is used. This results in an increased size of the distance measuring device. Accordingly, Japanese Examined Patent Publication No. 04-078924 discloses a stereo visual device. The stereo visual device uses a binarized edge image generated by binarizing the edge image of one of the original images, thus reducing the scale of calculations for generating the parallax image. Moreover, examples of vehicles provided with a distance measuring device include a vehicle that travels autonomously as described in Japanese Unexamined Patent Publication No. 2003-5832A.

The stereo visual device described in Japanese Examined Patent Publication No. 04-078924 generates an edge highlighted image having highlighted edges of one original image. Comparison is made between the pixel values of the edge highlighted image and a fixed value, and the resultant is binarized. Accordingly, the binarized edge image is generated. Then the parallax image is generated based on the binarized edge image and the other original image.

Japanese Unexamined Patent Publication No. 2003-5832A discloses a golf cart provided with an autonomous traveling device. This allows autonomous traveling along a guide path on a track. In addition, in Japanese Unexamined Patent Publication No. 2003-5832A, a distance to an obstacle is detected not with a parallax image but with an ultrasonic sensor.

However, the images of the same subject captured by individual cameras have variations in brightness. With the technique disclosed in Japanese Examined Patent Publication No. 04-078924, a binarized edge image is generated from the edge extraction image with a threshold. Consequently, the binarized edge image may easily be influenced by individual differences of the cameras capturing the images. This results in a decreased matching accuracy of the parallax image.

SUMMARY OF THE INVENTION

Preferred embodiments of the present invention have been made in view of the state of the art described above, and provide a distance measuring device with an enhanced matching accuracy of a parallax image as well as a vehicle provided with the distance measuring device.

A preferred embodiment of the present invention provides a distance measuring device that generates a parallax image to measure a distance. The distance measuring device includes a plurality of image sensors each capturing an image, an edge image extractor configured to extract an edge image based on the image, the edge image including pixel values each containing identification information used to identify an edge caused by a brightness variation from light to dark or an edge caused by a brightness variation from dark to light, a binarized edge image generator configured to generate a binarized edge image in accordance with the identification information of the edge image, a parallax image generator configured to generate a parallax image from the binarized edge image, and a distance image calculator configured to calculate a distance image from the parallax image.

According to a preferred embodiment of the present invention, the image sensors each capture the image. The edge image extractor extracts the edge image based on the captured image, the edge image including the pixel values each containing the identification information to identify the edge caused by the brightness variation from light to dark or the edge caused by the brightness variation from dark to light. The binarized edge image generator generates the edge image binarized in accordance with the identification information on the light-dark change of the edge image. The parallax image generator generates the parallax image based on the generated binarized edge image. The distance image calculator calculates the distance image from the parallax image.

As noted above, the edge image is not binarized based on the pixel values thereof but is binarized based on the identification information indicating the brightness variation. Consequently, the binarized edge image may contain the information on the brightness variations of the pixel values in the edge image from light to dark and from dark to light. Then, the parallax image is generated based on the binarized edge image including the information on the light-dark change. This provides enhanced matching accuracy of the parallax image. Moreover, the binarized edge image is generated for every captured image. This reduces the amount of calculations to generate the parallax image. Furthermore, the distance image is calculated based on the parallax image. This results in an enhanced accuracy of the measured distance and an enhanced calculating speed of the distance measuring device.

It is preferable that the identification information corresponds to positive and negative numerals. Consequently, the positive and negative numerals allow the application of the brightness variation to each of the pixel values in the edge image.

Moreover, it is preferable that the binarized edge image generator substitutes a pixel value without the identification information in the edge image with one of binary values in a regular manner depending on a vertical position. The binarized edge image generator substitutes the pixel value including no identification information in the edge image with one or the other of binary values with regularity depending on the vertical position in the binarized edge image. That is, the pixel with no brightness variation is substituted with one or the other of binary values with regularity depending on the vertical direction thereof, i.e., per row on the binarized edge image. Consequently, a region including the vertical regularity with one or the other of binary values on the binarized edge image is identified as a region with no brightness variation. As a result, even the binarized edge data may contain three types of information, i.e., information on the variation from light to dark, information on the variation from dark to light, and information on no brightness variation. This achieves an enhanced accuracy of the parallax image F as well as the enhanced accuracy of the measured distance by the distance measuring device.

Moreover, it is preferable that the pixel value without the identification information is 0. Setting the value 0 with no numeral for the pixel value with no identification information causes a reduction in the data amount of the edge image.

Moreover, it is preferable that the regularity is alternating regularity. The regions with no brightness variation on the binarized edge image are represented by the vertical alternating regularity with respect to one and the other of the binary values by row. This enhances the matching accuracy of the parallax image.

Moreover, it is preferable that the binarized edge image generator substitutes a pixel region without the identification information in the edge image with a horizontal-striped region including one and the other of binary values. The region with no identification information in the edge image is substituted with the horizontal-striped region including one and the other of binary values on the binarized edge image. This achieves an enhanced matching accuracy of the parallax image.

Moreover, a preferred embodiment of the present invention provides a vehicle including the above distance measuring device. The above distance measuring device provides accurate measurement of a distance between the vehicle and an object around the vehicle.

According to a preferred embodiment of the present invention, the edge image is not binarized based on the pixel values thereof but is binarized based on the identification information indicating the brightness variation. Consequently, the binarized edge image may contain the information on the brightness variations of the pixel values from light to dark and from dark to light in the edge image. Then, the parallax image is generated based on the binarized edge image including the information on the light-dark change. This enhances the matching accuracy of the parallax image. Moreover, the binarized edge image is generated for every captured image. This reduces the amount of calculations to generate the parallax image. Furthermore, the distance image is calculated based on the parallax image. This results in an enhanced accuracy of the measured distance and an enhanced calculating speed of the distance measuring device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following preferred embodiments of the present invention will be described with reference to the drawings. A golf cart traveling autonomously is described as one example of a vehicle according to the present preferred embodiment. The terms front and rear are relative to a direction in which a vehicle 1 travels.

First Preferred Embodiment

Figure 1:
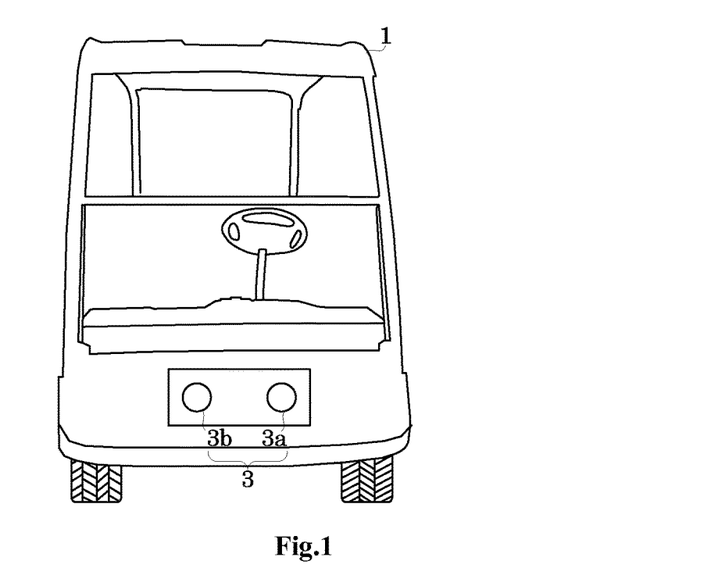
FIG. 1 is a front view of a vehicle according to a preferred embodiment of the present invention.
Figure 2:
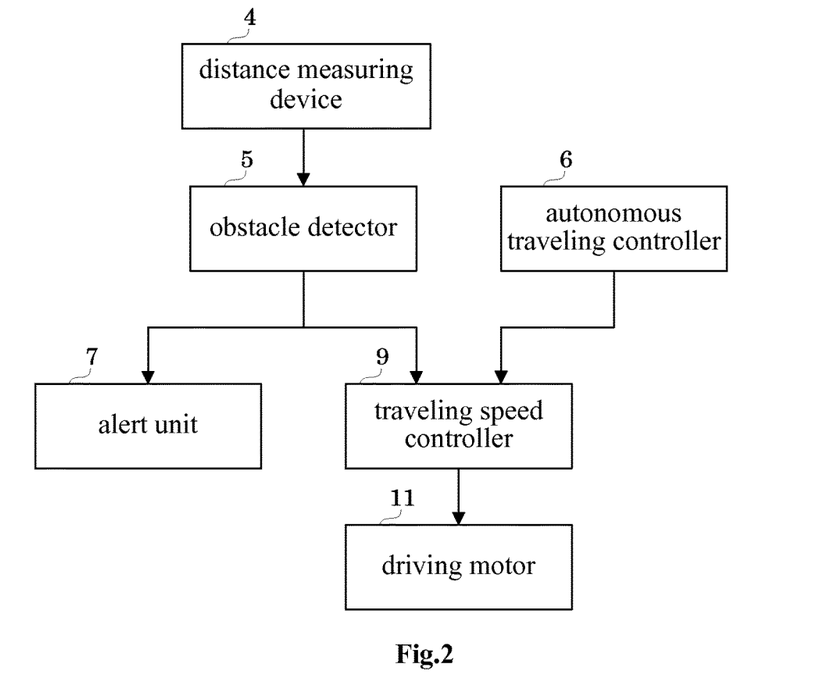
FIG. 2 is a block diagram of the vehicle according to a preferred embodiment of the present invention.

Reference is made to FIGS. 1 and 2. FIG. 1 is a schematic front view of the vehicle 1 according to a preferred embodiment of the present invention. FIG. 2 is a function block diagram of the vehicle 1. The vehicle 1 is preferably a golf cart, for example, that travels within a golf links automatically or manually. The vehicle 1 is configured to travel autonomously while being guided by electromagnetic waves emitted from guide path wires. The guide path wires are embedded in a track, for example. The vehicle 1 is provided with a stereo camera 3 on a front center surface thereof. The stereo camera 3 includes two image sensors 3a and 3b. The stereo camera 3 may include two or more image sensors. Specifically, the stereo camera 3 includes a left image sensor 3a and a right image sensor 3b. Either the left image sensor 3a or the right image sensor 3b is used as a reference camera. The stereo camera 3 does not necessarily include two image sensors. That is, three or more image sensors may be used, for example.

The vehicle 1 is also provided with a distance measuring device 4, an obstacle detector 5, an autonomous traveling controller 6, an alert unit 7, a traveling speed controller 9, and a driving motor 11. The distance measuring device 4 measures a distance between the vehicle 1 and an object around the vehicle 1 based on images captured by the stereo camera 3. The obstacle detector 5 detects an obstacle on the track where the vehicle 1 travels. The autonomous traveling controller 6 controls autonomous traveling of the vehicle 1 along the guide path wires. The alert unit 7 alerts a driver and surroundings of the vehicle 1 if the obstacle detector 5 detects an obstacle. The traveling speed controller 9 controls deceleration or stopping of the vehicle 1 upon the detection of an obstacle, and also controls the number of revolutions of the driving motor 11 that drives the wheels.

Figure 3:
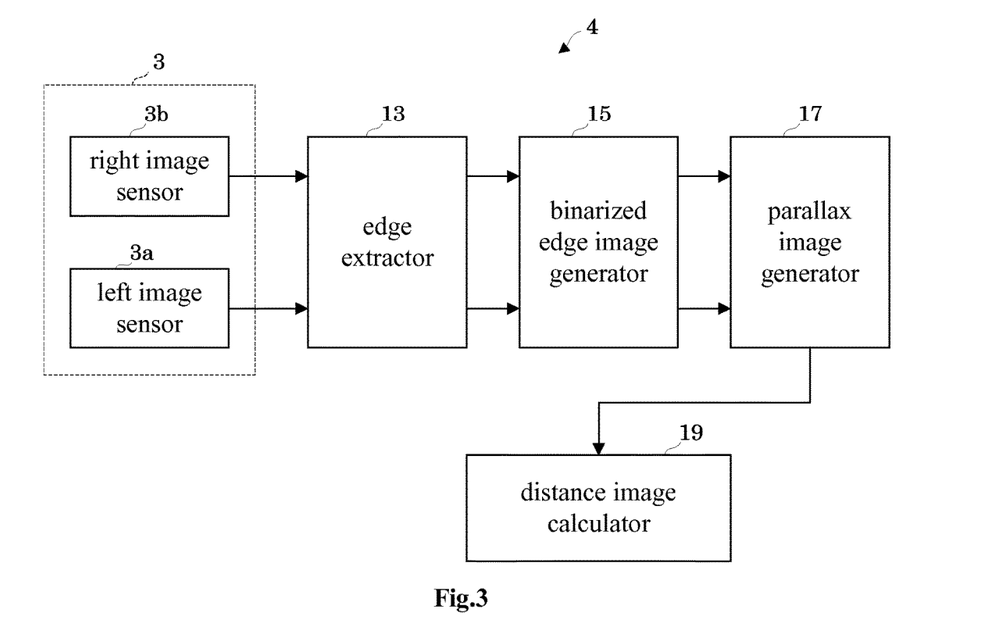
FIG. 3 is a block diagram of a distance measuring device according to a preferred embodiment of the present invention.

The following describes a distance measuring device 4 provided with the vehicle 1 with reference to FIG. 3. FIG. 3 is a block diagram of the distance measuring device.

The distance measuring device 4 includes the stereo camera 3, an edge extractor 13, a binarized edge image generator 15, a parallax image generator 17, and a distance image calculator 19. The stereo camera 3 captures an image in front of the vehicle 1. The edge extractor 13 extracts edges of the image captured by the stereo camera 3. The binarized edge image generator 15 binarizes the image whose edges are extracted. The parallax image generator 17 performs stereo matching on the binarized edge image to generate a parallax image. The distance image calculator 19 calculates a distance image from the parallax image. The edge extractor 13, the binarized edge image generator 15, the parallax image generator 17, and the distance image calculator 19 each preferably include a small CPU, a microprocessor or an FPGA, and a memory, for example. The following describes each of the above components in turn.

The image sensors 3a and 3b of the stereo camera 3 are installed under specific geometric conditions. In the present preferred embodiment, the image sensors 3a and 3b are installed horizontally apart by a certain distance. In other words, the image sensors 3a and 3b are parallel stereos. Moreover, the image sensors 3a and 3b are each a common visual sensor such as a CCD or a CMOS. In order to match positions in a row of the captured images, i.e., to match epipolar rows of the images, the image sensors 3a and 3b are each subjected to camera calibration in advance.

Figure 4:
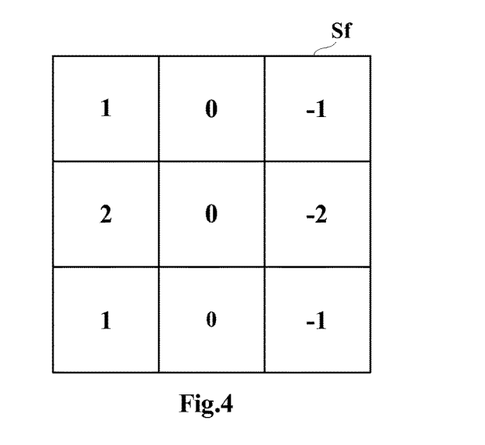
FIG. 4 illustrates a Sobel filter according to a preferred embodiment of the present invention.
Figure 5:
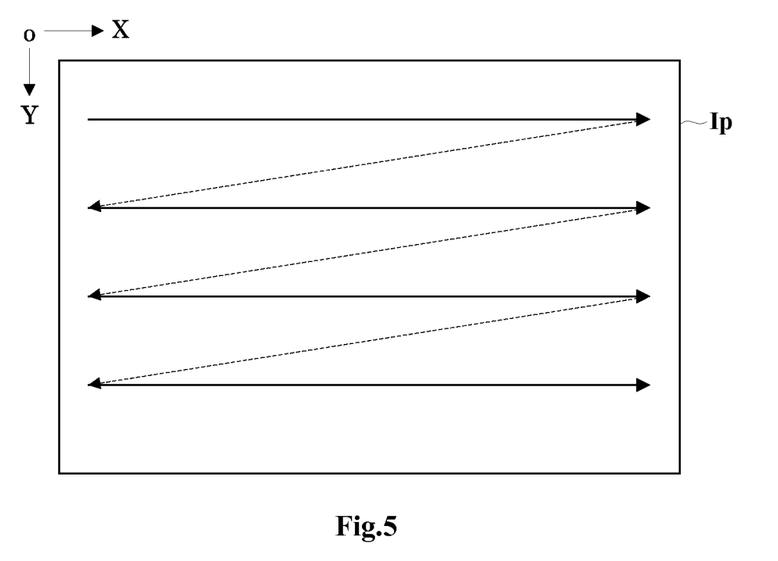
FIG. 5 illustrates an image scanning direction of the filter according to a preferred embodiment of the present invention.

The edge extractor 13 extracts edges of the images from the stereo camera 3, i.e., from the image sensors 3a and 3b, to generate edge images. The edge images are each extracted by a product-sum operation of brightness values of the images inputted from the image sensors 3a and 3b and numerical strings of a spatial filter stored in advance. Examples of the spatial filter include a Sobel filter Sf of 3 by 3 as shown in FIG. 4. As illustrated in FIG. 5, the spatial filter performs scanning on an inputted image IP in the same direction as raster scanning. Specifically, the raster scanning is performed firstly from the left to the right and then turns back downward to be performed again from the left to the right. Using the Sobel filter Sf achieves highlighted edges in the vertical direction of the captured image. Instead of the Sobel filter Sf, a differential filter such as a Prewitt filter may be used as the spatial filter.

The product-sum operation of the numerical strings in the Sobel filter Sf and brightness values of the images causes extraction of the edge image with positive and negative numerals. Here, the positive and negative numerals each indicate the following. That is, the positive numeral indicates the presence of a brightness variation from dark to light along the direction of filtering with the Sobel filter Sf, and the negative numeral indicates the presence of a brightness variation from light to dark. The value 0 indicates no brightness variation. In other words, the positive and negative numerals in the pixel values of the edge image is identification information used to identify the edge caused by the brightness variation from light to dark or the edge caused by the brightness variation from dark to light. Moreover, pixel values of the edge image may contain the identification information on the brightness variation obtained by another method.

Denoting a matrix of the Sobel filter Sf by Aij, a left edge image by EL(X,Y), and a left original image captured by the left image sensor 3a by IL(X,Y), the following expression is given:

$$E_L(X, Y) = \sum_{i=1}^{3} \sum_{j=1}^{3} I_L(X+i-2, Y+j-2) \times Aij \quad (1)$$

Consequently, the left edge image $E_L(X,Y)$ whose edges are extracted may have values within the range as indicated below:

$$-2040 \leq E_L(X,Y) \leq 2040 \quad (2)$$

Moreover, a product-sum operation of the Sobel filter Sf and a right original image $I_R(X,Y)$ captured by the right image sensor 3b is performed in a similar manner, such that a right edge image $E_R(X,Y)$ is extracted. The right edge image $E_R(X,Y)$ may have values within the same range as in the expression (2). A simple description of the edge image E(X,Y) provided below indicates both the left and right edge images $E_L(X,Y)$ and $E_R(X,Y)$.

The binarized edge image generator 15 generates the binarized edge image based on the edge image with the positive and negative numerals generated by the edge extractor 13. Denoting an inputted value of the left edge image by $E_L(X,Y)$ and a binarized left edge image to be outputted by $B_L(X,Y)$ in a pixel (X,Y), the following expression is given:

$$B_L(X, Y) = \begin{cases} 1 & (E_L(X, Y) \geq 0) \\ 0 & (E_L(X, Y) < 0) \end{cases} \quad (3)$$

If $E_L(X,Y)$ equals 0, i.e., if $E_L(X,Y)$ has the value 0 with no numeral, $E_L(X,Y)$ is substituted by either 0 as one of binary values or 1 as the other for binary values in the binarized edge image. In the present preferred embodiment, the value 1 is used. As a result, the binarized left edge image $B_L(X,Y)$ may have values within the following range:

$$0 \leq B_L(X,Y) \leq 1 \quad (4)$$

Then a binarized right edge image $B_R(X,Y)$ is generated from a right edge image $E_R(X,Y)$ in a similar manner. Accordingly, the binarized right edge image $B_R(X,Y)$ may have the values similarly obtained from in the expression (4). Below, a simple description of the binarized edge image B(X,Y) indicates both the binarized left edge images $B_L(X,Y)$ and binarized right edge images $B_R(X,Y)$.

Figure 6:
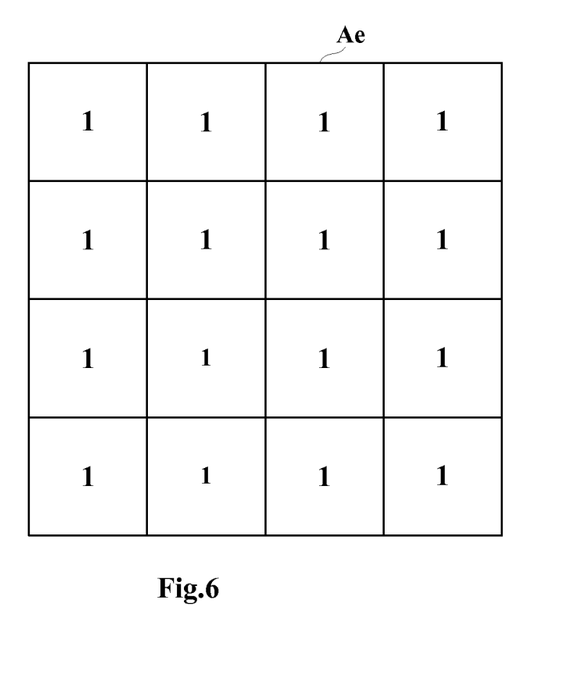
FIG. 6 illustrates one of the binarized pixel regions according to a preferred embodiment of the present invention.
Figure 7:
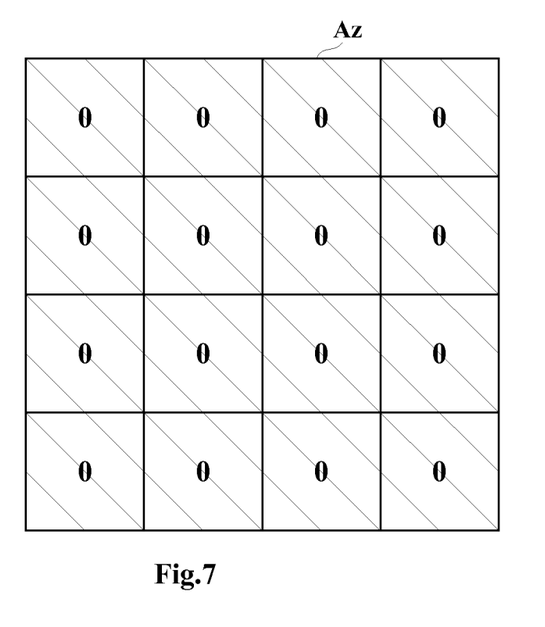
FIG. 7 illustrates the other binarized pixel region according to a preferred embodiment of the present invention.

For instance, as illustrated in FIG. 6, a region including positive numerals in the edge image E(X,Y) is substituted by a pixel region Ae with the value 1 in the binarized edge image B(X,Y). In addition, as illustrated in FIG. 7, a region including negative numerals in the edge image E(X,Y) is substituted by a pixel region Az with the value 0 in the binarized edge image B(X,Y).

Moreover, as illustrated in FIG. 6, a region including no numeral with the value 0 in the edge image E(X,Y) is substituted by the pixel region Ae with the value 1 in the binarized edge image B(X,Y).

Here, a data amount of the binarized edge image B(X,Y) is sufficiently compressed relative to a data amount of the edge image E(X,Y). This achieves a significant reduction in the memory used for calculations when generating the parallax image. In addition, the use of the binarized edge image allows the generation of the parallax image not only by SAD calculations but also by similarity calculations with a Hamming distance.

The parallax image generator 17 generates a parallax image from the inputted binarized left edge image $B_L(X, Y)$ and binarized right edge image $B_R(X,Y)$. The parallax image is generated by the currently-used method with SAD or a method with a Hamming distance. Both the methods lead to the same result. Consequently, the method with a higher calculation speed is selected depending on the calculation device used. The following is a calculation expression with SAD.

$$\text{Sum} = \sum_{i=-M}^{M} \sum_{j=-N}^{N} |B_L(X+i, Y+j) - B_R(X-d+i, Y+j)| \quad (5)$$

In the expression (5), M and N each denote a value indicating a range of an area adjacent to a target pixel. In addition, the following is a calculation expression with a Hamming distance. That is, the Hamming distance in the binary numbers is the resultant obtained by performing exclusive OR of different binary numbers A and B, and thereafter performing bit counting. For instance, a Hamming distance of binary numbers "1100" and "1001" is 2.

$$\text{Sum} = \sum_{i=-M}^{M} \sum_{j=-N}^{N} (B_L(X+i, Y+j) \text{ XOR } B_R(X-d+i, Y+j)) \quad (6)$$

The distance image calculator 19 calculates a real spatial distance to a subject indicated by the pixels based on the parallax image. The distance is calculated from the parallax image using the currently-used parallel stereo method. That is, the distance image including the distance information applied to each pixel in the left original image $I_L(X,Y)$ as a reference image is calculated using a distance between the two image sensors 3a and 3b, a focus distance of the two image sensors 3a and 3b, and the parallax image.

Figure 8:
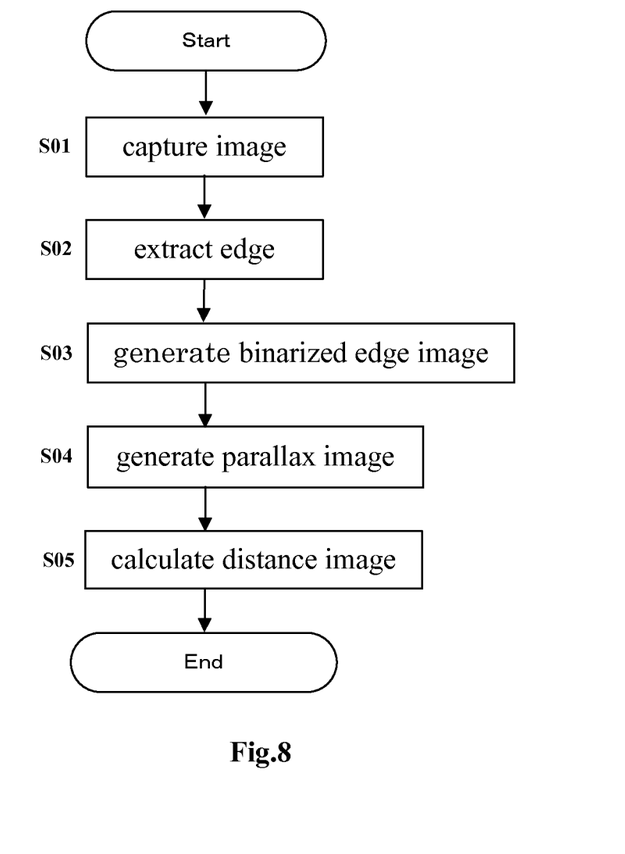
FIG. 8 is a flow chart illustrating the calculation of a distance image according to a preferred embodiment of the present invention.
Figure 9:
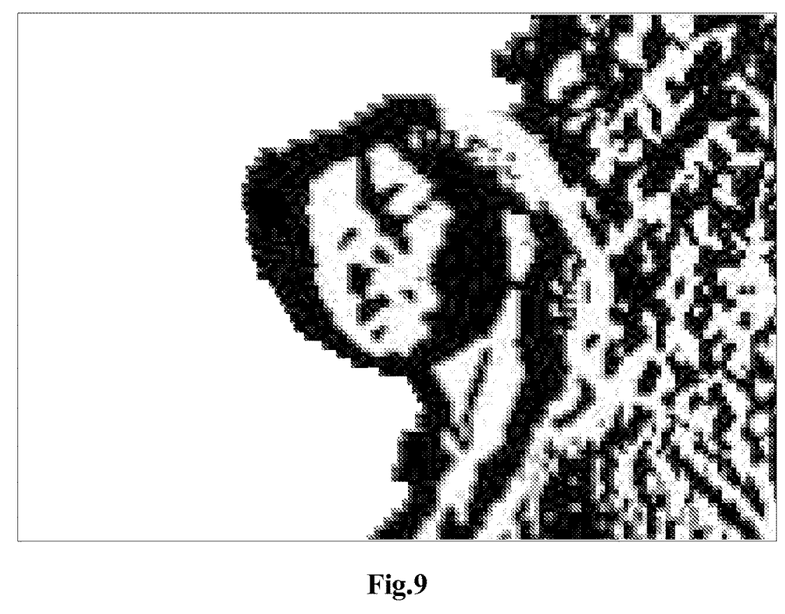
FIGS. 9 and 10 each illustrate a binarized edge image according to a preferred embodiment of the present invention.
Figure 10:
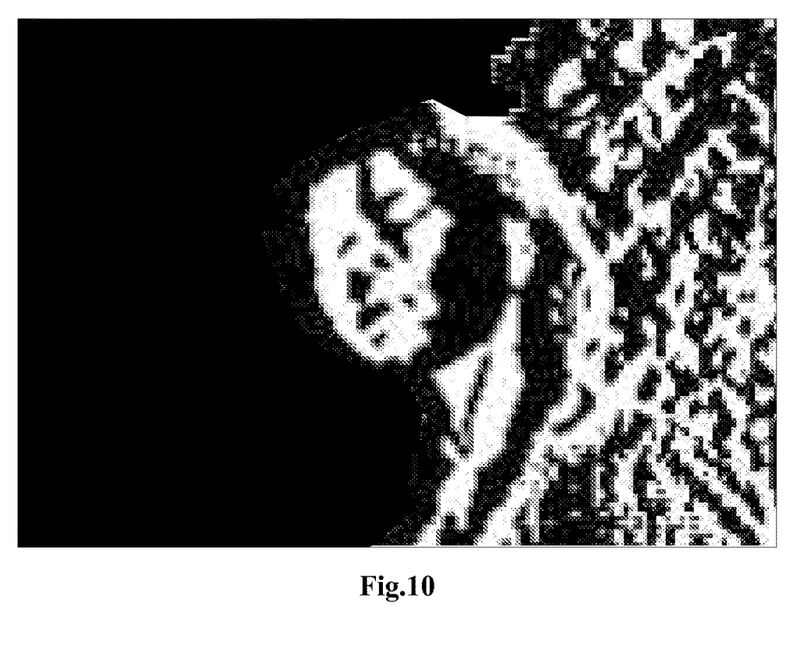

The following describes a distance measurement in the present preferred embodiment with reference to FIGS. 8 to 10. FIG. 8 is a flow chart illustrating the procedures of a distance image calculation. FIGS. 9 and 10 each illustrate a binarized edge image.

The stereo camera 3 provided on the front surface of the vehicle 1 captures a plurality of images (step S01). That is, the left and right image sensors 3a and 3b capture the images in front of the vehicle 1. The edge image extractor 13 extracts edge images from the left original image $I_L(X,Y)$ captured by the left image sensor 3a and the right original image $I_R(X,Y)$ captured by the right image sensor 3b, respectively (step S02). The binarized edge image generator 15 generates binarized edge images $B_L(X,Y)$ and $B_R(X,Y)$ based on the extracted left edge image $E_L(X,Y)$ and the right edge image $E_R(X,Y)$, respectively (step S03). FIG. 9 illustrates a binarized edge image generated from the expression (3). FIG. 10 illustrates a binarized edge image $B(X,Y)$ of the pixel value 0 binarized from the pixel value 0 with no numeral in the edge image $E(X,Y)$. Then the parallax image generator 17 generates a parallax image based on the binarized left edge images $B_L(X,Y)$ and binarized right edge images $B_R(X,Y)$ (step S04). The distance image calculator 19 calculates a distance image from the generated parallax image, the distance image containing distance information to the subject in the respective images captured by the reference camera (step S05).

When the distance image is calculated, the obstacle detector 5 detects the presence or absence of an obstacle through comparison of a distance and a level to the subject in the respective distance image with a preset threshold. If the presence of some obstacle is determined, the alert unit 7 alerts a driver and the surroundings. Examples of the alert unit 7 include a speaker or a monitor. In addition, the traveling speed controller 9 controls the deceleration or stopping of the vehicle 1, by decreasing the number of revolutions of the driving motor 11 or braking rotation of the driving motor 11. If the absence of any obstacle is determined, the vehicle 1 keeps travelling.

As noted above, in the present preferred embodiment, the parallax image is generated from the binarized edge image as a binary image. This achieves a significant reduction in the memory required to calculate stereo matching. Moreover, the binarized edge image is not generated based on the magnitude of the pixel values of the edge image but is generated based on the identification information indicating the light-dark change. This provides accurate obtainment of the binarized edge image in the same manner as the case with an extremely less brightness variation even when the brightness varies extremely between the images captured by the left image sensors 3a and right image sensors 3b.

Furthermore, a solid region with little or no pixel-value variation in the edge image is turned to a contrast region in the binarized edge image depending on the pixel-value variation. Accordingly, an enhanced accuracy of the stereo matching is obtained. As noted above, generation of the parallax image as well as calculation of the distance image is performed with less influences from individual differences of the image sensors.

Second Preferred Embodiment

The following describes a distance measuring device according to a second preferred embodiment of the present invention. Except for the configuration described below, the vehicle 1 and the distance measuring device 4 preferably each have the same configuration as that in the first preferred embodiment.

In the first preferred embodiment, the binarized edge image generator 15 substitutes the pixel value 0 with no numeral in the edge image $E(X,Y)$ by the value 0 or 1 in the binarized edge image $B(X,Y)$. In contrast to this, in the second preferred embodiment, the pixel value 0 with no numeral in the edge image $E(X,Y)$ is substituted by the value 0 or 1 with regularity in a vertical direction (Y-direction) of the image in the binarized edge image $B(X,Y)$.

The binarized edge image generator 15 in the present preferred embodiment generates a binarized edge image $B(X,Y)$ based on the edge image $E(X,Y)$ extracted by the edge extractor 13 including positive and negative numerals. Denoting an inputted value of a left edge image by $E_L(X,Y)$ and a binarized left edge image to be outputted by $B_L(X,Y)$ in a pixel $(X,Y)$, the following expression is given:

$$B_L(X, Y) = \begin{cases} 1 & (E_L(X, Y) > 0) \\ Y \% 2 & (E_L(X, Y) = 0) \\ 0 & (E_L(X, Y) < 0) \end{cases} \quad (7)$$

Figure 11:
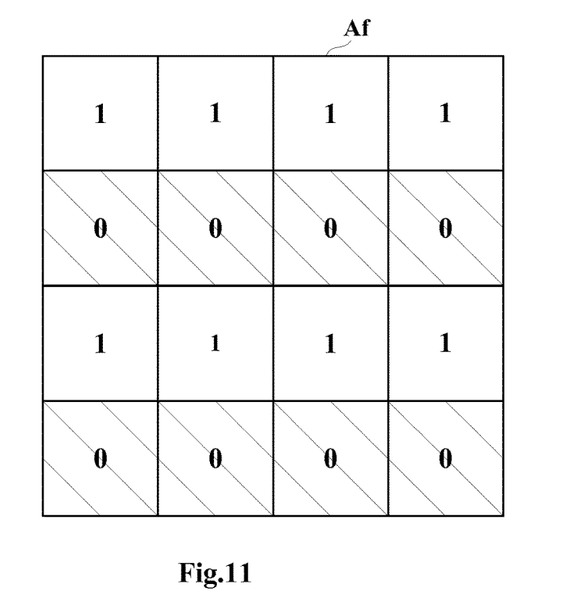
FIG. 11 illustrates a region in a binarized edge image according to another preferred embodiment of the present invention with no information on a light-dark change.
Figure 12:
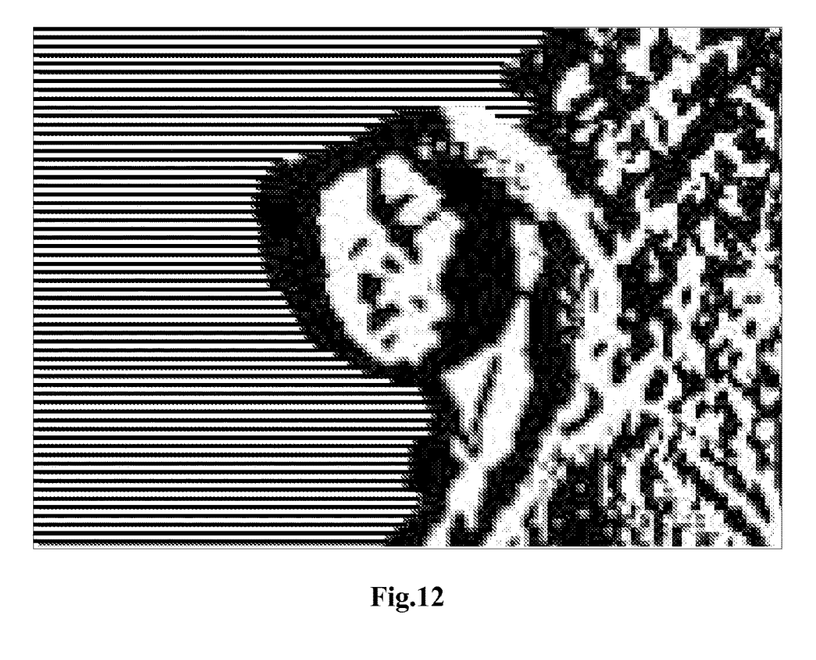
FIG. 12 illustrates the binarized edge image according to another preferred embodiment of the present invention.

In the expression (7), "Y %2" denotes "the reminder left when Y is divided by 2". That is, Y %2 equals 0 when Y is an even number, and Y %2 equals 1 when Y is an odd number. Consequently, as illustrated in FIG. 11, a pixel value 0 in an even number row in the edge image $E(X,Y)$ is substituted by the value 0 in the binarized edge image $B(X,Y)$, and a pixel value 0 in an odd number row is substituted by the value 1 in the binarized edge image B(X,Y). In this manner, the pixel region including the pixel value 0 in the edge image E(X,Y) is substituted by a horizontal-striped region Af. FIG. 12 illustrates a binarized edge image B(X,Y) obtained by binarizing the edge image E(X,Y) by the binarized edge image generator 15 in the present preferred embodiment. Such vertical and alternate arrangement of the pixel values 0 and 1 provides a Hamming calculation at high speed.

The binarized edge image B(X,Y) includes vertical and alternating regularity for each row of the pixel value 0 or 1 in the no light-dark change region. Accordingly, an enhanced matching accuracy of the parallax image is obtained. In addition, the region including the pixel value 0 in the edge image E(X,Y) is substituted by the horizontal-striped region Af including the pixel value 0 as one of the binary values and the pixel value 1 as the other binary value. Accordingly, the edge features in the vertical direction remain. This also achieves an enhanced matching accuracy of the parallax image.

As noted above, in addition to the advantages and effects of the first preferred embodiment, the second preferred embodiment provides reflection of three regions in the edge image E(X,Y) on the binary image, i.e., a positive-value region as the pixel region Ae, a negative-value region as the pixel region Az, and a 0-value region as the pixel region Af. Accordingly, such divided regions effectively function for similar calculations with SAD or a Hamming distance. That is, the parallax image is generated with a high matching accuracy even as the binary image. This provides highly accurate calculations of the distance image.

The present invention is not limited to the preferred embodiments described above, but may be modified as indicated below.

Figure 13:
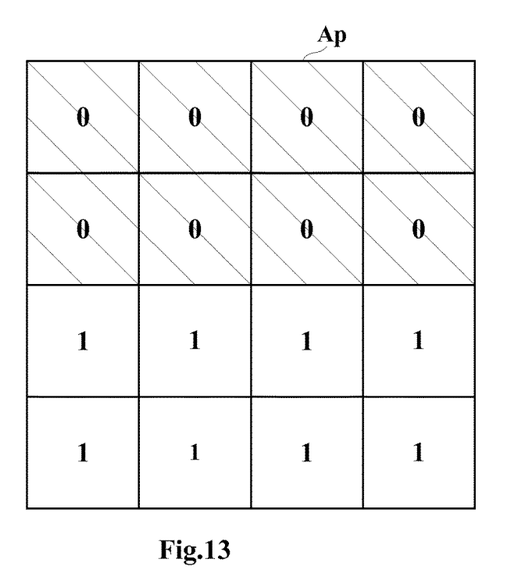
FIGS. 13 and 14 each illustrate a region in a binarized edge image according to a modification of a preferred embodiment of the present invention with no information on a light-dark change.
Figure 14:
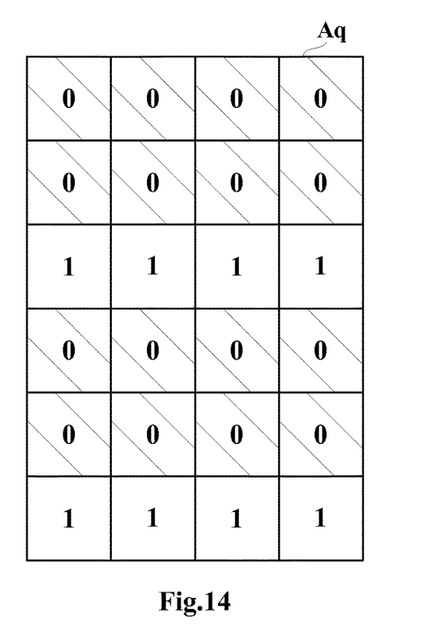

In the second preferred embodiment, the 0-value region with no numeral in the edge image E(X,Y) preferably is substituted by the pattern including the values 0 and 1 being arranged in alternate rows in the binarized edge image B(X,Y). However, this is not limitative. For instance, a pattern including the values 0 and 1 being arranged alternately every two rows may be used as the substitution (see FIG. 13). Alternatively, a pattern including the value 0 in two rows and the value 1 in one row being arranged alternately may be used (see FIG. 14). As noted above, another pattern may be used when substitution is performed by the value 0 or 1 in a row to cause the image to have vertical regularity.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A distance measuring device that generates a parallax image to measure a distance, the distance measuring device comprising:
a plurality of image sensors each configured to capture an image; and
one or more processors configured or programmed to:
extract an edge image of each of the images, the edge image including pixel values each containing identification information used to identify an edge caused by a brightness variation from light to dark or an edge caused by a brightness variation from dark to light;
generate a binarized edge image of each of the edge images in accordance with the identification information of the edge image;
generate the parallax image by matching the binarized edge images; and
calculate a distance image from the parallax image; wherein
the binarized edge image is generated by substituting a pixel value that includes the identification information for identifying the edge in the edge image caused by the brightness variation from light to dark with a binary value, and substituting a pixel value that includes the identification information for identifying the edge in the edge image caused by the brightness variation from dark to light with another binary value.

2. The distance measuring device according to claim 1, wherein the identification information includes positive and negative numerals.

3. The distance measuring device according to claim 1, wherein the one or more processors are configured or programmed to substitute a pixel value without the identification information in the edge image with the binary value or the another binary value in a regular manner depending on a vertical position of the pixel value.

4. The distance measuring device according to claim 1, wherein the one or more processors are configured or programmed to substitute a pixel value without the identification information in the edge image with zero.

5. A distance measuring device that generates a parallax image to measure a distance, the distance measuring device comprising:
a plurality of image sensors each configured to capture an image; and
one or more processors configured or programmed to:
extract an edge image of each of the images, the edge image including pixel values each containing identification information used to identify an edge caused by a brightness variation from light to dark or an edge caused by a brightness variation from dark to light;
generate a binarized edge image of each of the edge images in accordance with the identification information of the edge image;
generate the parallax image by matching the binarized edge images;
calculate a distance image from the parallax image; and
substitute a pixel value without the identification information in the edge image with one or another binary value in a regular manner depending on a vertical position of the pixel value; wherein
the regularity is alternating regularity.

6. A distance measuring device that generates a parallax image to measure a distance, the distance measuring device comprising:
a plurality of image sensors each configured to capture an image; and
one or more processors configured or programmed to:
extract an edge image of each of the images, the edge image including pixel values each containing identification information used to identify an edge caused by a brightness variation from light to dark or an edge caused by a brightness variation from dark to light;
generate a binarized edge image of each of the edge images in accordance with the identification information of the edge image;
generate the parallax image by matching the binarized edge images;
calculate a distance image from the parallax image; and substitute a pixel value without the identification information in the edge image with one or another binary value in a regular manner depending on a vertical position of the pixel value such that a pixel region without identification information in the edge image is substituted with a horizontal-striped region including the one and the another binary value.

7. A vehicle including the distance measuring device according to claim 1.

* * * * *